(12) United States Patent
Akiyama

(10) Patent No.: US 11,652,964 B2
(45) Date of Patent: May 16, 2023

(54) LIGHT SOURCE APPARATUS AND PROJECTOR

(71) Applicant: SEIKO EPSON CORPORATION, Tokyo (JP)

(72) Inventor: Koichi Akiyama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/670,693

(22) Filed: Feb. 14, 2022

(65) Prior Publication Data

US 2022/0264065 A1    Aug. 18, 2022

(30) Foreign Application Priority Data

Feb. 15, 2021    (JP) .............. JP2021-021501

(51) Int. Cl.
*H04N 9/31*    (2006.01)
*G03B 21/20*    (2006.01)

(52) U.S. Cl.
CPC ......... *H04N 9/317* (2013.01); *G03B 21/2013* (2013.01); *G03B 21/2033* (2013.01)

(58) Field of Classification Search
CPC . H04N 9/317; G03B 21/2013; G03B 21/2033
USPC ........................................ 359/621
See application file for complete search history.

(56) References Cited

U.S. PATENT DOCUMENTS

| | | | | |
|---|---|---|---|---|
| 2010/0110389 A1* | 5/2010 | Liao | ............ | G03B 21/14 353/31 |
| 2016/0040854 A1* | 2/2016 | Zhang | ............ | F21V 14/06 257/89 |
| 2020/0314397 A1 | 10/2020 | Akiyama | | |

FOREIGN PATENT DOCUMENTS

| | | |
|---|---|---|
| JP | 2000-131762 A | 5/2000 |
| JP | 2019-053241 A | 4/2019 |
| JP | 2020-160236 A | 10/2020 |

* cited by examiner

*Primary Examiner* — Jerry L Brooks
(74) *Attorney, Agent, or Firm* — Oliff PLC

(57) ABSTRACT

Four of laser light source sections each includes a semiconductor laser. Any two of the laser light source sections are disposed in an imaginary plane perpendicular to the center axis of a luminous flux and on a first imaginary line that intersects with the center axis so as to face each other with the center axis sandwiched between the two laser light source sections, and other two of the laser light source sections are disposed on a second imaginary line perpendicular to the first imaginary line so as to face each other with the center axis sandwiched between the two laser light source sections. The laser light source sections are at the same distance from the center axis. The first light, the second light, the third light, and the fourth light are each linearly polarized light and have the same polarization direction.

13 Claims, 6 Drawing Sheets

LIGHT SOURCE APPARATUS AND PROJECTOR

The present application is based on, and claims priority from JP Application Serial Number 2021-021501, filed Feb. 15, 2021, the disclosure of which is hereby incorporated by reference herein in its entirety.

BACKGROUND

1. Technical Field

The present disclosure relates to a light source apparatus and a projector.

2. Related Art

There is a known projector that modulates the light outputted from a light source to generate image light based on image information and projects the generated image light. JP-A-2019-53241 discloses a projector including a lamp light source and a liquid crystal panel having a plurality of pixels. The plurality of pixels each have four subpixels. The four subpixels are formed of a subpixel that modulates a blue beam, a subpixel that modulates a red beam, a subpixel that modulates a bluish green beam, and a subpixel that modulates a yellowish green beam.

JP-A-2000-131762 discloses a projector including a laser light source and a liquid crystal panel having a plurality of pixels. The plurality of pixels each have three subpixels. The three subpixels are formed of a subpixel that modulates a blue beam, a subpixel that modulates a green beam, and a subpixel that modulates a red beam.

JP-A-2020-160236 discloses a projector including a light source apparatus and a light modulator formed of a single liquid crystal panel. In the projector, blue, red, and two green beams having the same polarization direction are outputted from the light source apparatus, spatially separated from one another by a microlens array provided on the light incident side of the liquid crystal panel, and caused to be incident on blue, red, and two green subpixels of the liquid crystal panel.

To achieve what is called a single-plate projector, a projector including a single LCD panel having a plurality of pixels each formed of four subpixels as described above, the configurations in JP-A-2019-53241, JP-A-2000-131762, and JP-A-2020-160236 each cause an increase in the size of the light source apparatus, resulting in a difficulty reducing the size of the projector.

SUMMARY

To solve the problem described above, a light source apparatus according to an aspect of the present disclosure includes a first laser light source section that outputs first light having a first wavelength band, a second laser light source section that outputs second light having a second wavelength band different from the first wavelength band, a third laser light source section that outputs third light having the second wavelength band, and a fourth laser light source section that outputs fourth light having a third wavelength band different from the first and second wavelength bands. The first, second, third, and fourth laser light source sections each includes a semiconductor laser. Any two of the first, second, third, and fourth laser light source sections are disposed in an imaginary plane perpendicular to a center axis of a luminous flux formed of the first light, the second light, the third light, and the fourth light and on a first imaginary line that intersects with the center axis so as to face each other with the center axis sandwiched between the two laser light source sections, and other two of the first, second, third, and fourth laser light source sections are disposed in the imaginary plane and on a second imaginary line perpendicular to the first imaginary line so as to face each other with the center axis sandwiched between the two laser light source sections. The first, second, third, and fourth laser light source sections are disposed in the imaginary plane at the same distance from the center axis. The first light, the second light, the third light, and the fourth light are each linearly polarized light and have the same polarization direction.

A projector according to another aspect of the present disclosure includes the light source apparatus according to the aspect of the present disclosure, a light modulator that modulates light outputted from the light source apparatus in accordance with image information, and a projection optical apparatus that projects the light modulated by the light modulator.

DESCRIPTION OF EXEMPLARY EMBODIMENTS

First Embodiment

A first embodiment of the present disclosure will be described below with reference to the drawings.

Figure 1:
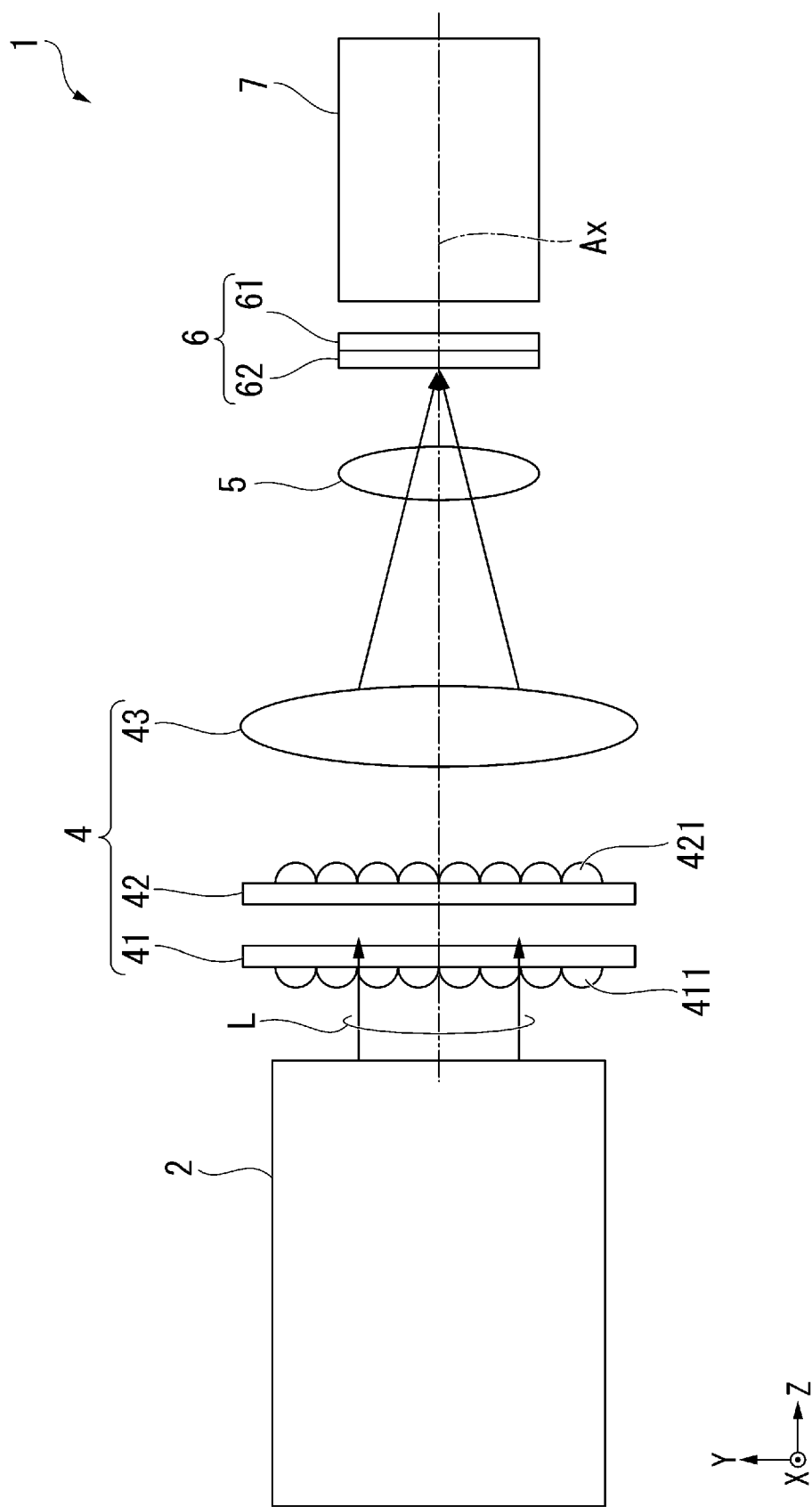
FIG. 1 is a schematic configuration diagram of a projector according to a first embodiment.

FIG. 1 is a schematic configuration diagram of a projector according to the first embodiment.

In the following drawings, components are drawn at different dimensional scales in some cases for clarification of each of the components.

A projector 1 according to the present embodiment modulates light outputted from a light source apparatus 2 to form an image according to image information and enlarges and projects the formed image on a projection receiving surface, such as a screen. In other words, a single light modulator 6 including a single liquid crystal panel 61 modulates the light outputted from the light source apparatus 2 to form an image, and the projector 1 projects the formed image. The projector 1 is what is called a single-panel projector.

The projector 1 includes the light source apparatus 2, a homogenizer 4, a field lens 5, the light modulator 6, and a projection optical apparatus 7, as shown in FIG. 1. The light source apparatus 2, the homogenizer 4, the field lens 5, the light modulator 6, and the projection optical apparatus 7 are disposed in predetermined positions along a system optical axis Ax. Four color beams formed of a blue beam LB, a green beam LG1, a green beam LG2, and a red beam LR outputted from the light source apparatus 2 are collectively referred to as one luminous flux L. The system optical axis Ax is the optical axis of the light source apparatus 2 and is defined as a center axis of the luminous flux L outputted from the light source apparatus 2.

The system optical axis Ax in the present embodiment corresponds to the center axis in the claims.

In the following description, an axis parallel to the traveling direction of the luminous flux L outputted from the light source apparatus 2 along the system optical axis Ax is called an axis Z, and the traveling direction of the luminous flux L is called a direction +Z. Two axes perpendicular to the axis Z and to each other are called an axis X and an axis Y. Out of the directions along the axes X, Y, and Z, the direction toward the upper side of the vertical direction in the space where the projector 1 is installed is called a direction +Y. The direction toward the right side of the horizontal direction is called a direction +X when a target object on which light is incident along the direction +Z is so viewed that the direction +Y is oriented toward the upper side of the vertical direction. Although not shown, the direction opposite the direction +X is a direction −X, the direction opposite the direction +Y is a direction −Y, and the direction opposite the direction +Z is a direction −Z.

The configuration of the light source apparatus 2 will be described later in detail.

The homogenizer 4 homogenizes the illuminance of the luminous flux L outputted from the light source apparatus 2 in an image formation area of the light modulator 6, which is irradiated with the luminous flux L. The homogenizer 4 includes a first multi-lens 41, a second multi-lens 42, and a superimposing lens 43. In place of the configuration described above, a homogenizer having another configuration may be provided, or no homogenizer may be provided.

The first multi-lens 41 includes a plurality of lenses 411 arranged in a matrix in a plane perpendicular to the center axis of the luminous flux L incident from the light source apparatus 2, that is, the system optical axis Ax. The plurality of lenses 411 of the first multi-lens 41 divide the luminous flux L incident from the light source apparatus 2 into a plurality of sub-luminous fluxes.

The second multi-lens 42 includes a plurality of lenses 421 arranged in a matrix in a plane perpendicular to the system optical axis Ax and corresponding to the plurality of lenses 411 of the first multi-lens 41. The lenses 421 receive the sub-luminous fluxes having exited out of the lenses 411 facing the lenses 421. The lenses 421 cause the sub-luminous fluxes to enter the superimposing lens 43.

The superimposing lens 43 superimposes the plurality of sub-luminous fluxes incident from the second multi-lens 42 with one another in the image formation area of the light modulator 6. In detail, the second multi-lens 42 and the superimposing lens 43 cause the blue beam LB, the red beam LR, and the two green beams LG, which have each been divided into a plurality of sub-luminous fluxes, to enter a plurality of microlenses 621, which form a microlens array 62, which will be described later, of the light modulator 6, via the field lens 5 at different angles.

The field lens 5 is disposed between the homogenizer 4 and the light modulator 6. The field lens 5 guides the luminous flux L having exited out of the homogenizer 4 to the light modulator 6.

The light modulator 6 modulates the light outputted from the light source apparatus 2. In detail, the light modulator 6 modulates the color beams outputted from the light source apparatus 2 and incident on the light modulator 6 via the homogenizer 4 and the field lens 5 in accordance with image information to form image light according to the image information. The light modulator 6 includes the single liquid crystal panel 61 and the single microlens array 62.

The configuration of the light source apparatus 2 will be described below.

Figure 2:
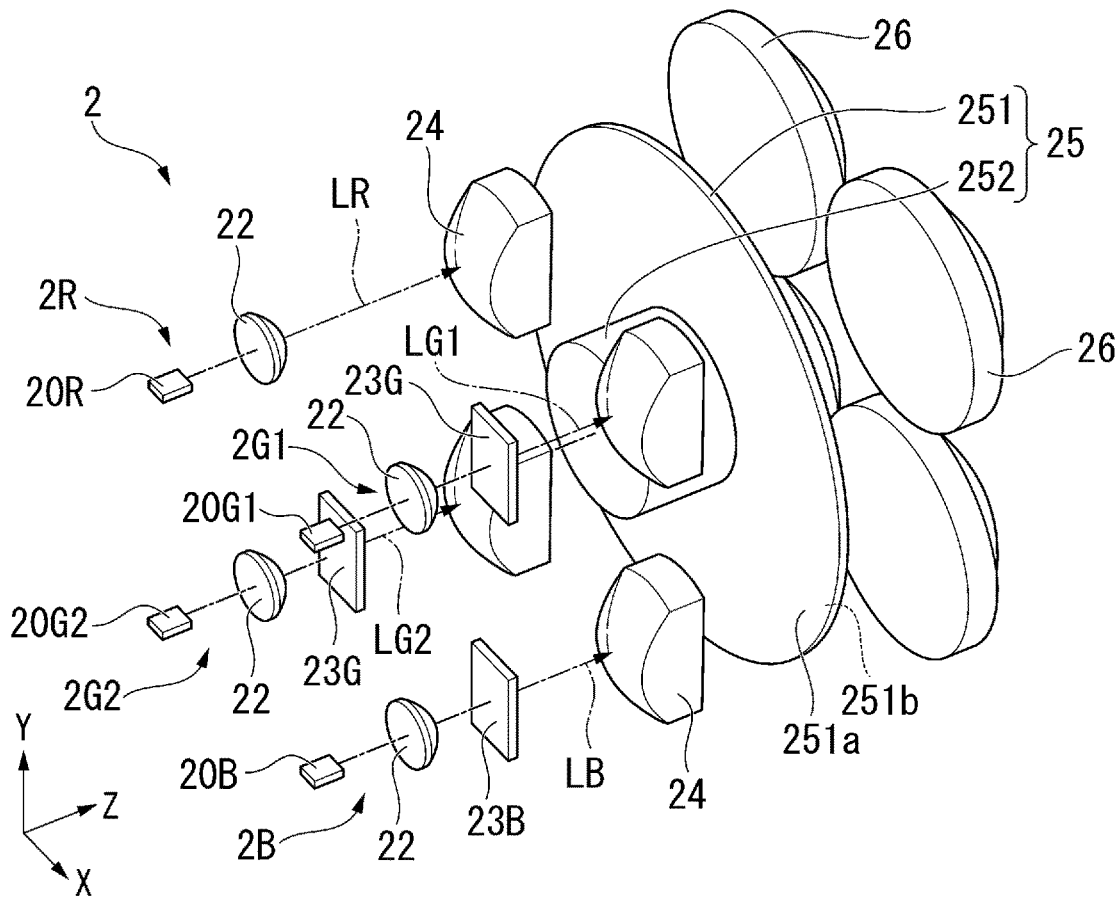
FIG. 2 is a perspective view of a light source apparatus.

FIG. 2 is a perspective view of the light source apparatus 2.

The light source apparatus 2 includes a blue laser light source section 2B, a first green laser light source section 2G1, a second green laser light source section 2G2, a red laser light source section 2R, a plurality of collimator lenses 22, a plurality of retardation films 23B and 23G, a plurality of focusing lenses 24, a rotating diffuser plate 25, a plurality of pickup lenses 26, as shown in FIG. 2.

The blue laser light source section 2B in the present embodiment corresponds to the first laser light source section in the claims. The first green laser light source section 2G1 in the present embodiment corresponds to the second laser light source section in the claims. The second green laser light source section 2G2 in the present embodiment corresponds to the third laser light source section in the claims. The red laser light source section 2R in the present embodiment corresponds to the fourth laser light source section in the claims.

The blue laser light source section 2B includes a blue semiconductor laser 20B. The blue semiconductor laser 20B outputs the blue beam LB having a blue wavelength band ranging, for example, from 445 to 485 nm. The first green laser light source section 2G1 includes a first green semiconductor laser 20G1. The second green laser light source section 2G2 includes a second green semiconductor laser 20G2. The second green semiconductor laser 20G2 outputs the green beam LG2 having a green wavelength band ranging, for example, from 520 to 550 nm. The red laser light source section 2R includes a red semiconductor laser 20R. The red semiconductor laser 20R outputs the red beam LR having a red wavelength band ranging, for example, from 620 to 645 nm. The peak wavelength of the green beam LG1 and the peak wavelength of the green beam LG2 may be equal to or different from each other within the green wavelength band described above.

The blue beam LB in the present embodiment corresponds to the first light in the claims. The green beam LG1 in the present embodiment corresponds to the second light in the claims. The green beam LG2 in the present embodiment corresponds to the third light in the claims. The red beam LR in the present embodiment corresponds to the fourth light in the claims.

Figure 3:
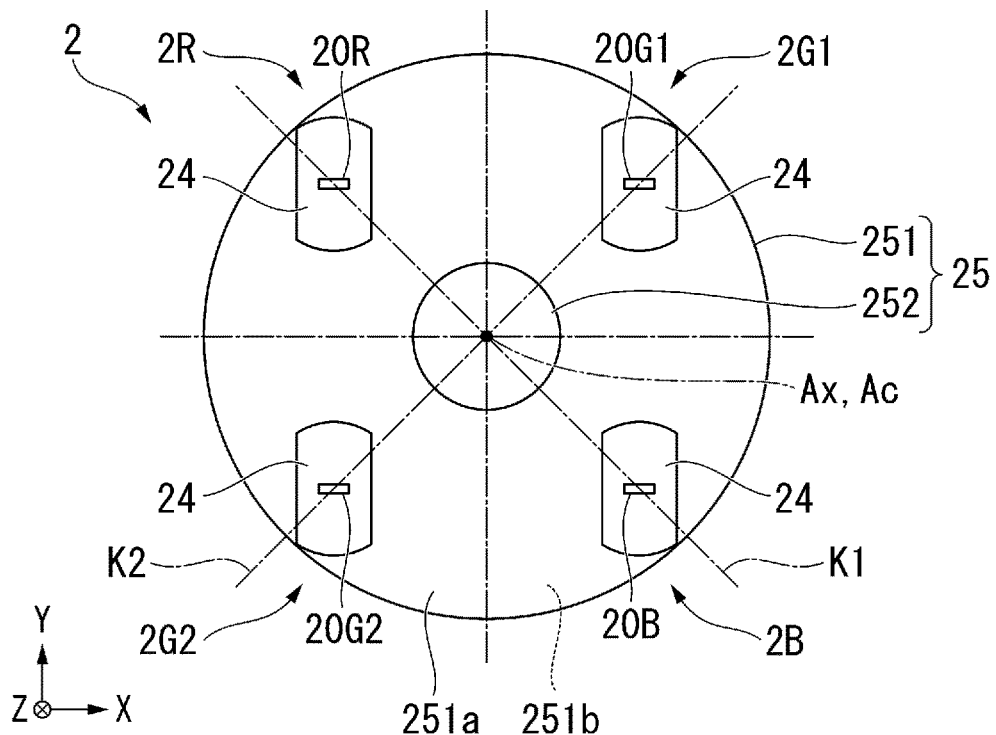
FIG. 3 is a front view of the light source apparatus.

FIG. 3 is a front view of the light source apparatus 2 viewed from the side −Z. In FIG. 3, the collimator lenses 22, the retardation films 23B and 23G, and other components are omitted for clarity of the drawing.

The blue semiconductor laser 20B and the red semiconductor laser 20R are disposed in an imaginary plane perpendicular to the system optical axis Ax and on a first imaginary line K1, which intersects with the system optical axis Ax, as shown in FIG. 3. Furthermore, the blue semiconductor laser 20B and the red semiconductor laser 20R are disposed on the first imaginary line K1 so as to face each other with the system optical axis Ax sandwiched between the two semiconductor lasers. The first green semiconductor laser 20G1 and the second green semiconductor laser 20G2 are disposed in the imaginary plane perpendicular to the system optical axis Ax and on a second imaginary line K2, which is perpendicular to the first imaginary line K1, which intersects with the system optical axis Ax. Furthermore, the first green semiconductor laser 20G1 and the second green semiconductor laser 20G2 are disposed on the second imaginary line K2 so as to face each other with the system optical axis Ax sandwiched between the two semiconductor lasers. The blue semiconductor laser 20B, the red semiconductor laser 20R, the first green semiconductor laser 20G1, and the second green semiconductor laser 20G2 are disposed at the same distance from the system optical axis Ax. The imaginary plane perpendicular to the system optical axis Ax is a plane parallel to the plane XY.

More specifically, the blue semiconductor laser 20B is disposed in the imaginary plane perpendicular to the system optical axis Ax and in a position shifted toward the sides +X and −Y with respect to the system optical axis Ax as the center. The red semiconductor laser 20R is disposed in the imaginary plane perpendicular to the system optical axis Ax and in a position shifted toward the sides −X and +Y with respect to the system optical axis Ax as the center. The first green semiconductor laser 20G1 is disposed in the imaginary plane perpendicular to the system optical axis Ax and in a position shifted toward the sides +X and +Y with respect to the system optical axis Ax as the center. The second green semiconductor laser 20G2 is disposed in the imaginary plane perpendicular to the system optical axis Ax and in a position shifted toward the sides −X and −Y with respect to the system optical axis Ax as the center.

The four color beams LB, LR, LG1, and LG2 outputted from the semiconductor lasers 20B, 20G1, 20G2, and 20R are thus incident on four locations separate from one another on a light incident surface 251a of a diffuser plate 251. Specifically, the four color beams LB, LG1, LG2, and LR are incident on the light incident surface 251a, which is parallel to the plane XY, and in a position shifted toward the sides +X and −Y, a position shifted toward the sides −X and +Y, a position shifted toward the sides +X and +Y, and a position shifted toward the sides −X and −Y with respect to the system optical axis Ax as the center.

The collimator lenses 22 are provided on the light exiting side of the semiconductor lasers 20B, 20G1, 20G2, and 20R, as shown in FIG. 2. The collimator lenses 22 parallelize the color beams LB, LG1, LG2, and LR outputted from the semiconductor lasers 20B, 20G1, 20G2, and 20R corresponding to the collimator lenses 22.

Current high-power semiconductor lasers for projectors are typically AlInGaN-based semiconductor lasers as a blue semiconductor laser and AlGaInP-based semiconductor lasers as a red semiconductor laser. As described above, the polarization direction of the blue beam LB outputted from the blue semiconductor laser 20B and the polarization direction of the red beam LR outputted from the red semiconductor laser 20R differ from each other due to the different constituent materials and crystal structures of the blue semiconductor laser 20B and the red semiconductor laser 20R.

Figure 4:
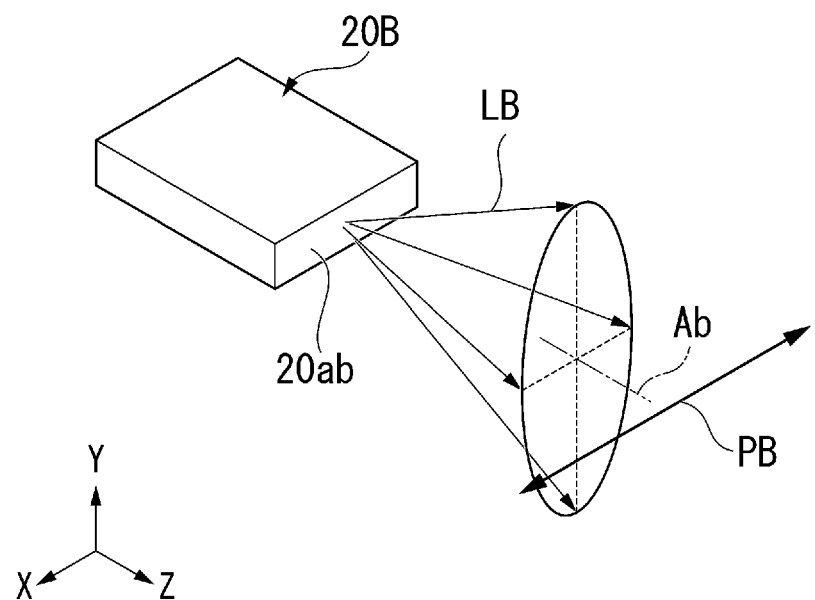
FIG. 4 shows the direction in which the light outputted from a blue semiconductor laser deflects.

FIG. 4 shows the direction in which the blue beam LB outputted from the blue semiconductor laser 20B deflects.

The blue semiconductor laser 20B has a rectangular light exiting surface 20ab having short edges and long edges when viewed in the direction along a chief ray Ab of the blue beam LB, as shown in FIG. 4. The blue beam LB outputted from the blue semiconductor laser 20B has an angle of divergence in the widthwise direction of the light exiting surface 20ab that is greater than the angle of divergence in the lengthwise direction of the light exiting surface 20ab. As a result, the cross section perpendicular to the chief ray Ab of the blue beam LB has an elliptical shape having a major axis along the widthwise direction of the light exiting surface 20ab and a minor axis along the lengthwise direction of the light exiting surface 20ab. A polarization direction PB of the blue beam LB coincides with the lengthwise direction of the light exiting surface 20ab, that is, the direction of the minor axis of the elliptical cross-sectional shape.

Although not shown, the green beams LG1 and LG2 outputted from the two green semiconductor lasers 20G1 and 20G2 are also the same as the blue beam LB. That is, the cross section of each of the green beams LG1 and LG2 that is perpendicular to the chief ray thereof has an elliptical shape having a major axis along the widthwise direction of the light exiting surface and a minor axis along the lengthwise direction of the light exiting surface. The polarization direction of each of the green beams LG1 and LG2 coincides with the lengthwise direction of the light exiting surface, that is, the direction of the minor axis of the elliptical cross-sectional shape.

Figure 5:
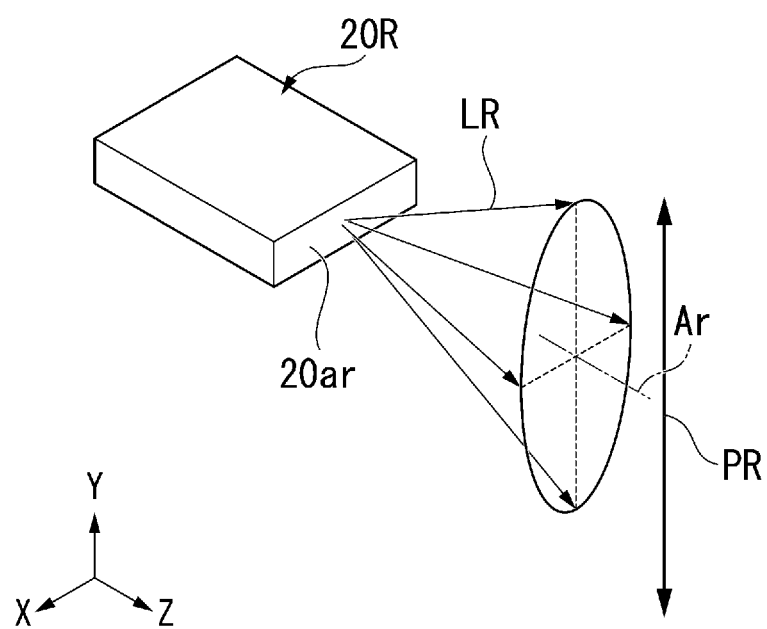
FIG. 5 shows the direction in which the light outputted from a red semiconductor laser deflects.

FIG. 5 shows the direction in which the red beam LR outputted from the red semiconductor laser 20R deflects.

Also in the case of the red semiconductor laser 20R, the cross-section of the red beam LR that is perpendicular to a chief ray Ar thereof has an elliptical shape having a major axis along the widthwise direction of a light exiting surface 20ar and a minor axis along the lengthwise direction of the light exiting surface 20ar, as shown in FIG. 5, as in the case of the blue semiconductor laser 20B. Due to the above-mentioned difference in the constituent materials, however, a polarization direction PR of the red beam LR coincides with the widthwise direction of the light exiting surface 20ar, that is, the direction of the major axis of the elliptical cross-sectional shape.

In the present embodiment, the blue semiconductor laser 20B, the red semiconductor laser 20R, the first green semiconductor laser 20G1, and the second green semiconductor laser 20G2 are each so disposed that the widthwise direction of the light exiting surface is oriented in the axis-Y direction and the lengthwise direction of the light exiting surface is oriented in the axis-X direction, as shown in FIGS. 2 and 3. The polarization direction of the blue beam LB and the green beams LG1 and LG2 and the polarization direction of the red beam LR are therefore perpendicular to each other in the plane XY. The polarization direction of the blue beam LB and the green beams LG1 and LG2 and the polarization direction of the red beam LR thus differ from each other immediately after the beams exit from the semiconductor lasers.

In view of the fact described above, the retardation film 23B is provided in the optical path of the blue beam LB outputted from the blue semiconductor laser 20B, and the retardation films 23G are provided in the optical paths of the green beams LG1 and LG2 outputted from the first green semiconductor laser 20G1 and the second green semiconductor laser 20G2, as shown in FIG. 2. The retardation film 23B in the optical path of the blue beam LB is formed of a half-wave plate for the blue wavelength band. The retardation films 23G in the optical paths of the green beams LG1 and LG2 are each formed of a half-wave plate for the green wavelength band.

When the blue beam LB and the green beams LG1 and LG2 pass through the retardation films 23B and 23G, the polarization directions of the beams before entering the retardation films 23B and 23G are rotated by 90° in a plane perpendicular to the traveling directions of the beams. The polarization direction of the blue beam LB and the green beams LG1 and LG2 and the polarization direction PR of the red beam LR are therefore oriented in the axis-Y direction and coincide with each other. In place of the configuration in the present embodiment, a retardation film may be provided in the optical path of the red beam LR outputted from the red semiconductor laser 20R. In this case, the retardation film is formed of a half-wave plate for the red wavelength band. According to the configuration described above, the polarization direction of the blue beam LB and the green beams LG1 and LG2 and the polarization direction PR of the red beam LR are therefore oriented in the axis-X direction and coincide with each other. The blue beam LB, the green beams LG1 and LG2, and the red beam LR are linearly polarized light beams having the same polarization direction.

The rotating diffuser plate 25 is provided as a component common to the blue semiconductor laser 20B, the red semiconductor laser 20R, the first green semiconductor laser 20G1, and the second green semiconductor laser 20G2 on the light exiting side thereof. The rotating diffuser plate 25 includes the diffuser plate 251 and a driver 252.

The diffuser plate 251 is rotatable around an axis of rotation Ac parallel to the system optical axis Ax. In the present embodiment, the position of the axis of rotation Ac of the diffuser plate 251 coincides with the position of the system optical axis Ax, as shown in FIG. 3. The diffuser plate 251 is formed of a transmissive diffuser plate having the light incident surface 251a and a light exiting surface 251b. The diffuser plate 251 diffuses each of the following beams at a predetermined angle of diffusion: the blue beam LB outputted from the blue semiconductor laser 20B; the green beam LG1 outputted from the first green semiconductor laser 20G1; the green beam LG2 outputted from the second green semiconductor laser 20G2; and the red beam LR outputted from the red semiconductor laser 20R.

The driver 252 is formed of a motor that rotates the diffuser plate 251 around the axis of rotation Ac parallel to the system optical axis Ax. In the present embodiment, the axis of rotation Ac of the diffuser plate 251 is directly coupled to the drive shaft of the motor. The driver 252 is disposed on the side facing the light incident surface 251a of the diffuser plate 251. That is, the driver 252 is provided on the same side of the diffuser plate 251 as the side where the focusing lenses 24 are provided.

The focusing lenses 24 are provided in the optical path of the blue beam LB between the blue semiconductor laser 20B and the diffuser plate 251, the optical path of the green beam LG1 between the first green semiconductor laser 20G1 and the diffuser plate 251, the optical path of the green beam LG2 between the second green semiconductor laser 20G2 and the diffuser plate 251, and the optical path of the red beam LR between the red semiconductor laser 20R and the diffuser plate 251. The focusing lenses 24 bring the color beams LB, LG1, LG2, and LR that enter the focusing lenses 24 into focus on the diffuser plate 251.

Viewed in the direction of the system optical axis Ax, the focusing lenses 24 each do not have a circular shape but are so shaped that portions on opposite sides in the axis-X direction are cut out. That is, the shape of each of the focusing lenses 24 viewed in the direction of the system optical axis Ax has a widthwise direction parallel to the lengthwise direction of the light exiting surface of each of the semiconductor lasers 20B, 20G1, 20G2, and 20R and a lengthwise direction parallel to the widthwise direction of the light exiting surface of each of the semiconductor lasers 20B, 20G1, 20G2, and 20R.

The pickup lenses 26 are provided in the optical path of the blue beam LB having exited out of the diffuser plate 251, the optical path of the green beam LG1 having exited out of the diffuser plate 251, the optical path of the green beam LG2 having exited out of the diffuser plate 251, and the optical path of the red beam LR having exited out of the diffuser plate 251. The pickup lenses 26 guide the color beams LB, LG1, LG2, and LR having exited out of the diffuser plate 251 to the downstream homogenizer 4.

In the present embodiment, the distance between the pickup lens 26 in the optical path of the blue beam LB and the diffuser plate 251, the distance between the pickup lens 26 in the optical path of each of the green beams LG1 and LG2 and the diffuser plate 251, and the distance between the pickup lens 26 in the optical path of the red beam LR and the diffuser plate 251 differ from one another. Specifically, the distance between the pickup lens 26 in the optical path of the blue beam LB and the diffuser plate 251 is shorter than the distance between the pickup lens 26 in the optical path of each of the green beams LG1 and LG2 and the diffuser plate 251. The distance between the pickup lens 26 in the optical path of each of the green beams LG1 and LG2 and the diffuser plate 251 is shorter than the distance between the pickup lens 26 in the optical path of the red beam LR and the diffuser plate 251. In place of the configuration described above, the distances between the pickup lenses 26 and the diffuser plate 251 may be equal to one another.

Figure 6:
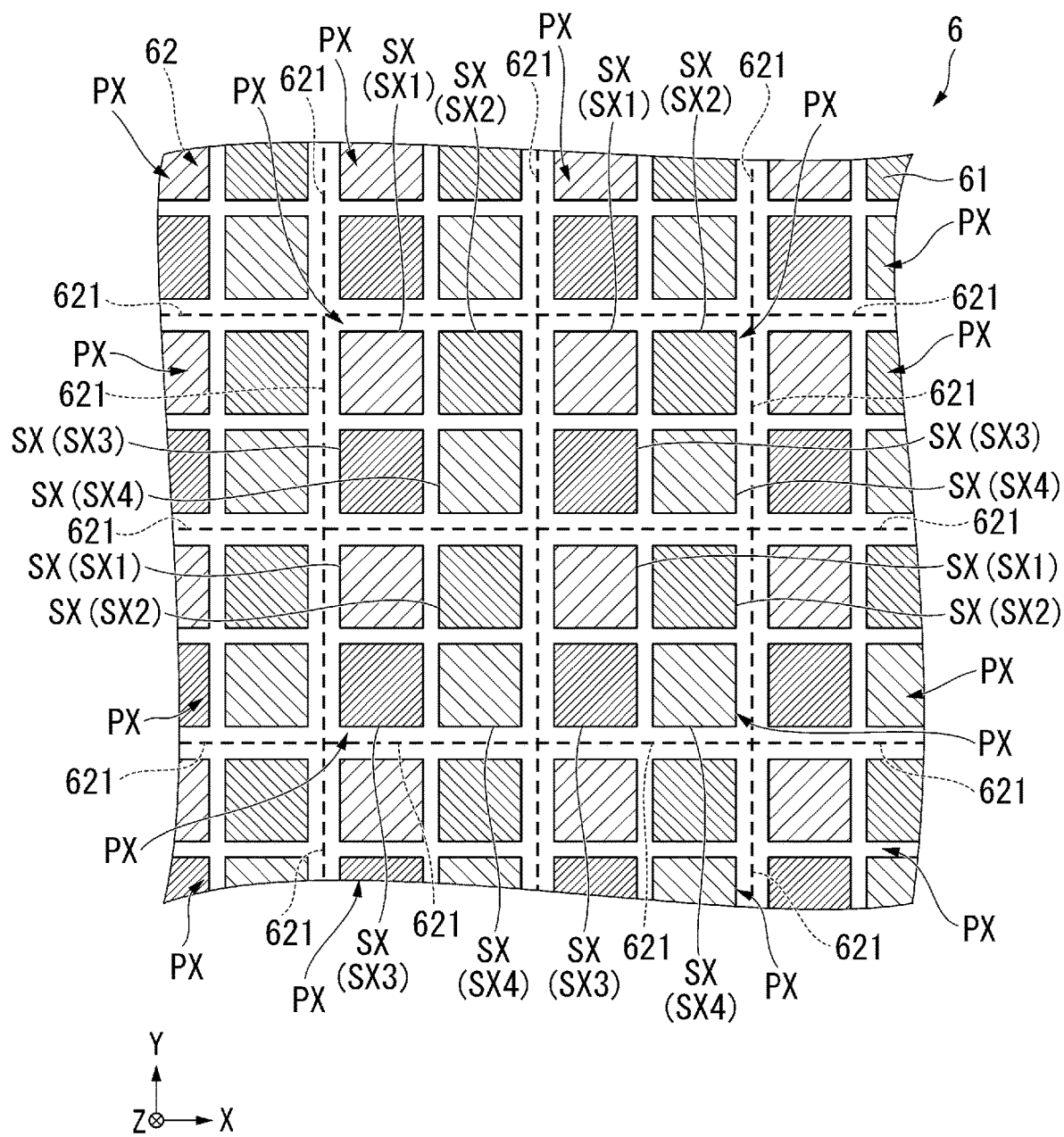
FIG. 6 is an enlarged view of a light modulator.

FIG. 6 is an enlarged diagrammatic view of part of the light modulator 6 viewed in the direction −Z. In other words, FIG. 6 shows the correspondence between pixels PX provided in the liquid crystal panel 61 and the microlenses 621 provided in the microlens array 62.

The liquid crystal panel 61 has a plurality of pixels PX arranged in a matrix in a plane perpendicular to the system optical axis Ax (axis Z), as shown in FIG. 6.

The pixels PX each have a plurality of subpixels SX, which modulate the color beams having the colors different from one another. In the present embodiment, the pixels PX each have four subpixels SX (SX1 to SX4). Specifically, with respect to the center of a rectangular pixel PX, a first subpixel SX1 is disposed in a position shifted in the directions −X and +Y. A second subpixel SX2 is disposed in a position shifted in the directions +X and +Y. A third subpixel SX3 is disposed in a position shifted in the directions −X and +Y. A fourth sub-pixel SX4 is disposed in a position shifted in the directions +X and −Y.

The microlens array 62 is provided on the light incident side (side −Z) of the liquid crystal panel 61, as shown in FIG. 1. The microlens array 62 guides the plurality of color beams LB, LG1, LG2, and LR that enter the microlens array 62 to the individual pixels PX. The microlens array 62 includes the plurality of microlenses 621 corresponding to the plurality of pixels PX.

The plurality of microlenses 621 are arranged in a matrix in a plane perpendicular to the system optical axis Ax, as shown in FIG. 6. In other words, the plurality of microlenses 621 are arranged in a matrix in a plane perpendicular to the center axis of the light incident from the field lens 5. In the present embodiment, the microlenses 621 are each provided in correspondence with two subpixels arranged in the direction +X and two subpixels arranged in the direction +Y. That is, the microlenses 621 are each provided in correspondence with the four subpixels SX1 to SX4, which are arranged in two rows and two columns in the plane XY.

The blue beam LB, the green beams LG1 and LG2, and the red beam LR superimposed on one another by the homogenizer 4 are incident on each of the microlenses 621 at angles of incidence different from one another. The microlenses 621 therefore each cause the color beams incident thereon to be distributed and incident on the subpixels SX corresponding to the color beams.

The projection optical apparatus 7 projects the light modulated by the light modulator 6, that is, image forming light onto the projection receiving surface (not shown), such as a screen, as shown in FIG. 1. The projection optical apparatus 7 includes a single projection lens or a plurality of projection lenses.

Effects of First Embodiment

The light source apparatus 2 according to the present embodiment includes the blue laser light source section 2B, which outputs the blue beam LB, the first green laser light source section 2G1, which outputs the green beam LG1, the second green laser light source section 2G2, which outputs the green beam LG2, and the red laser light source section 2R, which outputs the red beam LR. The blue laser light source section 2B, the first green laser light source section 2G1, the second green laser light source section 2G2, and the red laser light source section 2R include the semiconductor lasers 20B, 20G1, 20G2, and 20R, respectively. The blue laser light source section 2B and the red laser light source section 2R are located in an imaginary plane perpendicular to the system optical axis Ax so as to face each other with the system optical axis Ax sandwiched between the two laser light source sections on the first imaginary line K1, which intersects with the system optical axis Ax. The first green laser light source section 2G1 and the second green laser light source section 2G2 are located in the imaginary plane so as to face each other with the system optical axis Ax sandwiched between the two laser light source sections on the second imaginary line K2, which intersects with the first imaginary line K1. The blue laser light source section 2B, the red laser light source section 2R, the first green laser light source section 2G1, and the second green laser light source section 2G2 are disposed in the imaginary plane at the same distance from the system optical axis Ax. The blue beam LB, the green beams LG1 and LG2, and the red beam LR outputted from the light source apparatus 2 are linearly polarized light beams having the same polarization direction.

The configuration described above allows the four color beams LB, LG1, LG2, and LR to exit from four spatially separate positions on the light source apparatus 2, whereby the color beams can be efficiently incident on the light modulator 6 having the pixels PX each formed of the four subpixels SX. Furthermore, since the four color beams LB, LG1, LG2, and LR having the same polarization direction are outputted from the light source apparatus 2, there is no need to use a narrow-interval polarization converter, whereby the size of the light source apparatus 2 can be reduced. Moreover, since the light emitting sources are semiconductor lasers and there is therefore no need to use a wavelength converter, such as a phosphor, the configuration of the light source apparatus 2 can be simplified in addition to the reduction in size thereof. Furthermore, since the two green beams LG1 and LG2 are outputted, the brightness of an image can be increased when the light source apparatus 2 is used in the projector 1.

The light source apparatus 2 according to the present embodiment further includes the retardation film 23B provided in the optical path of the blue beam LB outputted from the blue laser light source section 2B and the retardation films 23G provided in the optical paths of the green beams LG1 and LG2 outputted from the first green laser light source section 2G1 and the second green laser light source section 2G2.

According to the configuration described above, even when the color beams LB, LG1, LG2, and LR outputted from the laser light source sections 2B, 2G1, 2G2, and 2R have polarization directions different from one another, the retardation films 23B and 23G can be used to produce the four color beams LB, LG1, LG2, and LR having the same polarization direction. The semiconductor lasers 20B, 20G1, 20G2, and 20R of the laser light source sections 2B, 2G1, 2G2, and 2R can be disposed in the same orientation regardless of the difference in polarization direction.

The light source apparatus 2 according to the present embodiment further includes the diffuser plate 251, which diffuses the blue beam LB outputted from the blue laser light source section 2B, the green beam LG1 outputted from the first green laser light source section 2G1, the green beam LG2 outputted from the second green laser light source section 2G2, and the red beam LR outputted from the red laser light source section 2R, and the driver 252, which rotates the diffuser plate 251 around the axis of rotation Ac parallel to the system optical axis Ax.

According to the configuration described above, the diffuser plate 251 can homogenize the intensity distribution of each of the color beams LB, LG1, LG2, and LR outputted from the light source apparatus 2. Furthermore, when used in the projector 1, the light source apparatus 2 can suppress speckles. Moreover, since the diffuser plate 251 is rotated by the driver 252, heat generated by the diffuser plate 251 is suppressed, whereby the reliability of the diffuser plate 251 can be improved.

The light source apparatus 2 according to the present embodiment further includes the focusing lenses 24 provided in the optical path of the blue beam LB between the blue laser light source section 2B and the diffuser plate 251, the optical path of the green beam LG1 between the first laser light source section 2G1 and the diffuser plate 251, the optical path of the green beam LG2 between the second laser light source section 2G2 and the diffuser plate 251, and the optical path of the red beam LR between the red laser light source section 2R and the diffuser plate 251.

According to the configuration described above, the focusing lenses 24 allow the color beams LB, LG1, LG2, and LR outputted from the light source apparatus 2 to efficiently enter the diffuser plate 251.

In the light source apparatus 2 according to the present embodiment, the driver 252 is provided on the same side of the diffuser plate 251 as the side where the focusing lenses 24 are provided, and the shape of each of the focusing lenses 24 viewed in the direction of the system optical axis Ax has a widthwise direction parallel to the lengthwise direction of the light exiting surface of each of the semiconductor lasers 20B, 20G1, 20G2, and 20R and a lengthwise direction parallel to the widthwise direction of the light exiting surface.

Since the color beams LB, LG1, LG2, and LR outputted from the semiconductor lasers 20B, 20G1, 20G2, and 20R each have an elliptical cross-sectional shape perpendicular to the chief ray of the color beam, even the focusing lenses 24 each having an elongated shape in one direction as described above can be used to cause the color beams LB, LG1, LG2, and LR to efficiently enter the diffuser plate 251. Even when the driver 252 and the focusing lenses 24 are disposed on the same side of the diffuser plate 251, the focusing lenses 24 are unlikely to interfere with the driver 252 because the focusing lenses 24 each having an elongated shape in one direction are used.

The light source apparatus 2 according to the present embodiment further includes the pickup lenses 26 provided in the optical path of the blue beam LB having exited out of the diffuser plate 251, the optical path of the green beam LG1 having exited out of the diffuser plate 251, the optical path of the green beam LG2 having exited out of the diffuser plate 251, and the optical path of the red beam LR having exited out of the diffuser plate 251.

According to the configuration described above, the color beams LB, LG1, LG2, and LR having exited out of the diffuser plate 251 can be efficiently guided to the homogenizer 4.

In the light source apparatus 2 according to the present embodiment, the distance between the pickup lens 26 in the optical path of the blue beam LB and the diffuser plate 251, the distance between the pickup lens 26 in the optical path of each of the green beams LG1 and LG2 and the diffuser plate 251, and the distance between the pickup lens 26 in the optical path of the red beam LR and the diffuser plate 251 differ from one another.

According to the configuration described above, the distances between the pickup lenses 26 and the diffuser plate 251 can be optimized for each of the wavelengths of the beams, whereby the color beams LB, LG1, LG2, and LR having exited out of the diffuser plate 251 can be more efficiently guided to the homogenizer 4.

The projector 1 according to the present embodiment includes the light source apparatus 2 having the configuration described above, the light modulator 6, which modulates the luminous flux L outputted from the light source apparatus 2 in accordance with image information, and the projection optical apparatus 7, which projects the luminous flux L modulated by the light modulator 6.

According to the configuration described above, a compact, highly efficient projector 1 can be achieved.

Second Embodiment

A second embodiment of the present disclosure will be described below with reference to FIG. 7.

The projector according to the second embodiment has the same configuration as the projector according to the first embodiment, but the positional relationship between the laser light source sections and the diffuser plate differ from that in the first embodiment. The overall configuration of the projector will therefore not be described.

Figure 7:
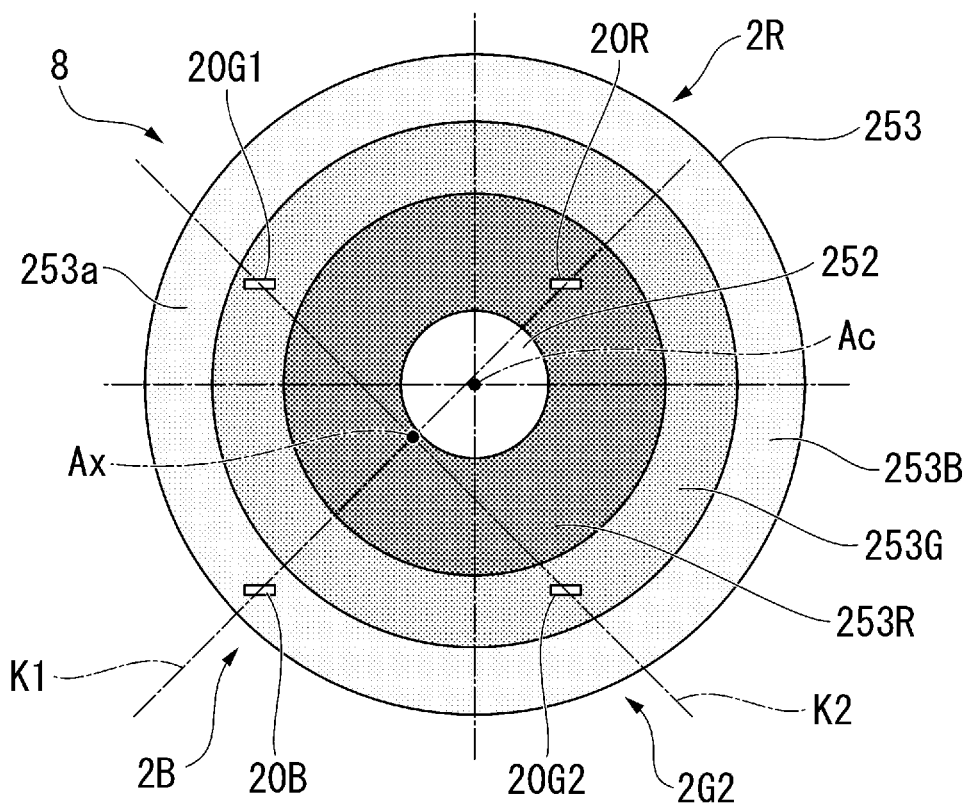
FIG. 7 is a front view of the light source apparatus according to a second embodiment.

FIG. 7 is a front view of the light source apparatus according to the second embodiment. In FIG. 7, the collimator lenses, the retardation films, the focusing lenses, and other components are not illustrated for clarity of the drawing.

In FIG. 7, components common to those in the figures used in the first embodiment have the same reference characters and will not be described.

Also in a light source apparatus 8 according to the present embodiment, the blue semiconductor laser 20B and the red semiconductor laser 20R are disposed in an imaginary plane perpendicular to the system optical axis Ax and on the first imaginary line K1, which intersects with the system optical axis Ax, as shown in FIG. 7, as in the first embodiment. Furthermore, the blue semiconductor laser 20B and the red semiconductor laser 20R are disposed on the first imaginary line K1 so as to face each other with the system optical axis Ax sandwiched between the two semiconductor lasers. The first green semiconductor laser 20G1 and the second green semiconductor laser 20G2 are disposed in the imaginary plane perpendicular to the system optical axis Ax and on the second imaginary line K2, which is perpendicular to the first imaginary line K1, which intersects with the system optical axis Ax. Furthermore, the first green semiconductor laser 20G1 and the second green semiconductor laser 20G2 are disposed on the second imaginary line K2 so as to face each other with the system optical axis Ax sandwiched between the two semiconductor lasers. The blue semiconductor laser 20B, the red semiconductor laser 20R, the first green semiconductor laser 20G1, and the second green semiconductor laser 20G2 are disposed at the same distance from the system optical axis Ax. The imaginary plane perpendicular to the system optical axis Ax is a plane parallel to the plane XY.

In the first embodiment, the position of axis of the rotation of the diffuser plate coincides with the position of the system optical axis Ax. In contrast, the axis of rotation Ac of a diffuser plate 253 is disposed in a position separate from the system optical axis Ax in the present embodiment. That is, the axis of rotation Ac of the diffuser plate 253 is disposed in a position shifted toward the sides +X and +Y with respect to the system optical axis Ax as the center. In the imaginary plane perpendicular to the system optical axis Ax, the axis of rotation Ac of the diffuser plate 253 and the system optical axis Ax are separate from each other by a predetermined distance. The positions, on a light incident surface 253a of the diffuser plate 253, where the color beams LB, LG1, LG2, and LR are incident are therefore located at distances different from one another from the axis of rotation Ac. On the light incident surface 253a of the diffuser plate 253, the distance from the axis of rotation Ac to the position where the blue beam LB is incident is longer than the distances from the axis of rotation Ac to the positions where the green beams LG1 and LG2 are incident. The distances from the axis of rotation Ac to the positions where the green beams LG1 and LG2 are incident are longer than the distance from the axis of rotation Ac to the position where the red beam LR is incident.

In the present embodiment, the diffuser plate 253 has a first diffusion area 253B, where the blue beam LB enters, a second diffusion area 253G, where the green beams LG1 and LG2 enter, and a third diffusion area 253R, where the red beam LR enters. The first diffusion area 253B, the second diffusion area 253G, and the third diffusion area 253R are provided concentrically with one another. The first diffusion area 253B is provided on the side facing the outer circumference of the diffuser plate 253. The third diffusion area 253R is provided on the side facing the inner circumference of the diffuser plate 253. The second diffusion area 253G is provided between the first diffusion area 253B and the third diffusion area 253R. The positional relationship among the first diffusion area 253B, the second diffusion area 253G, and the third diffusion area 253R is not limited to the example described above and can be changed as appropriate in accordance with the direction in which the axis of rotation Ac of the diffuser plate 253 is shifted with respect to the system optical axis Ax.

The first diffusion area 253B, the second diffusion area 253G, and the third diffusion area 253R have diffusion characteristics different from one another. Specifically, the third diffusion area 253R diffuses light incident thereon more strongly than the second diffusion area 253G. The second diffusion area 253G diffuses light incident thereon more strongly than the first diffusion area 253B.

The other configurations of the light source apparatus 8 are the same as those in the first embodiment.

Effects of Second Embodiment

The light source apparatus 8 according to the present embodiment also provides the same effects as those provided by the first embodiment: The color beams LB, LG1, LG2, and LR can be efficiently incident on the light modulator 6 having the pixels PX each formed of the four subpixels SX; the size of the light source apparatus 8 can be reduced; and the configuration of the light source apparatus 8 can be simplified.

In the light source apparatus 8 according to the present embodiment, the axis of rotation Ac of the diffuser plate 253 is located in a position separate from the system optical axis Ax, and the diffuser plate 253 has the first diffusion area 253B, where the blue beam LB enters, the second diffusion area 253G, where the green beams LG1 and LG2 enter, and the third diffusion area 253R, where the red beam LR enters.

According to the configuration described above, the diffusion characteristics of the diffusion areas 253B, 253G, and 253R can be optimized in accordance with the wavelengths of the color beams incident thereon.

In the light source apparatus 8 according to the present embodiment, the first diffusion area 253B, the second diffusion area 253G, and the third diffusion area 253R have diffusion characteristics different from one another. Specifically, the third diffusion area 253R diffuses light incident thereon more strongly than the second diffusion area 253G. The second diffusion area 253G diffuses light incident thereon more strongly than the first diffusion area 253B.

When color beams enter a diffuser plate having a fixed diffusion characteristic, a color beam having a shorter wavelength tends to diffuse more strongly than a color beam having a longer wavelength. Therefore, according to the above configuration, substantially same diffusion angle distribution of the color beams LB, LG1, LG2 and LR output from the diffuser plate 253 can be obtained.

Third Embodiment

A third embodiment of the present disclosure will be described below with reference to FIG. 8.

The projector according to the third embodiment has the same configuration as the projector according to the first embodiment, but the arrangement of the semiconductor lasers of the laser light source sections differs from that in the first embodiment. The overall configuration of the projector will therefore not be described.

Figure 8:
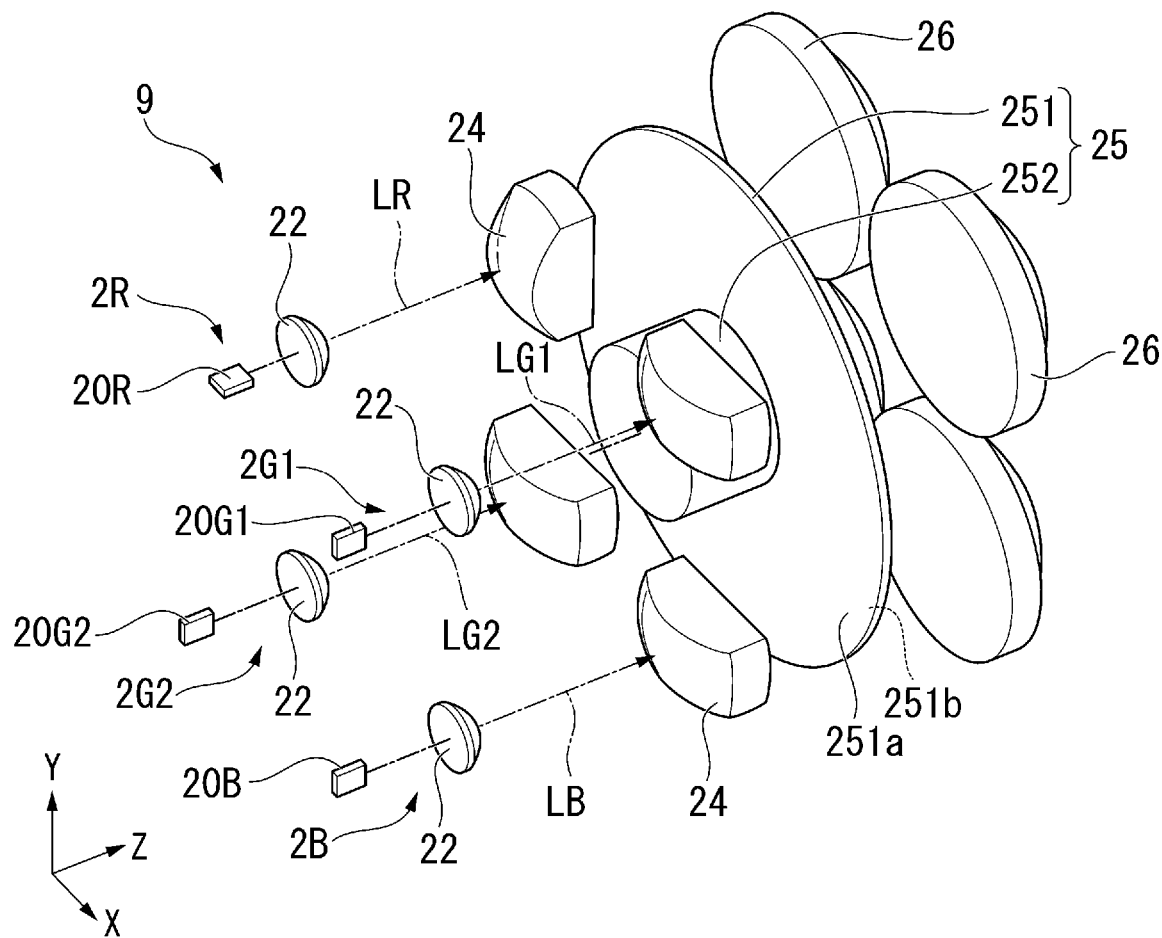
FIG. 8 is a perspective view of the light source apparatus according to a third embodiment.

FIG. 8 is a perspective view of a light source apparatus 9 according to the third embodiment.

In FIG. 8, components common to those in the figures used in the first embodiment have the same reference characters and will not be described.

Also in the light source apparatus 9 according to the present embodiment, the blue semiconductor laser 20B and the red semiconductor laser 20R are disposed in an imaginary plane perpendicular to the system optical axis Ax and on the first imaginary line K1, which intersects with the system optical axis Ax, as shown in FIG. 8, as in the first embodiment. Furthermore, the blue semiconductor laser 20B and the red semiconductor laser 20R are disposed on the first imaginary line K1 so as to face each other with the system optical axis Ax sandwiched between the two semiconductor lasers. The first green semiconductor laser 20G1 and the second green semiconductor laser 20G2 are disposed in the imaginary plane perpendicular to the system optical axis Ax and on the second imaginary line K2, which is perpendicular to the first imaginary line K1, which intersects with the system optical axis Ax. Furthermore, the first green semiconductor laser 20G1 and the second green semiconductor laser 20G2 are disposed on the second imaginary line K2 so as to face each other with the system optical axis Ax sandwiched between the two semiconductor lasers. The blue semiconductor laser 20B, the red semiconductor laser 20R, the first green semiconductor laser 20G1, and the second green semiconductor laser 20G2 are disposed at the same distance from the system optical axis Ax. The imaginary plane perpendicular to the system optical axis Ax is a plane parallel to the plane XY.

In the first embodiment, all the four semiconductor lasers are disposed in the same orientation. In contrast, in the present embodiment, the blue semiconductor laser 20B, the first green semiconductor laser 20G1, and the second green semiconductor laser 20G2 are disposed in the same orientation, but the three semiconductor lasers 20B, 20G1, and 20G2 and the red semiconductor laser 20R are disposed in orientations different from each other. That is, the red semiconductor laser 20R is so disposed that the widthwise direction of the light exiting surface is oriented in the axis-Y direction and the lengthwise direction of the light exiting surface is oriented in the axis-X direction, as in the first embodiment. On the other hand, the blue semiconductor laser 20B, the first green semiconductor laser 20G1, and the second green semiconductor laser 20G2 are each so disposed that the widthwise direction of the light exiting surface is oriented in the axis-X direction and the lengthwise direction of the light exiting surface is oriented in the in axis-Y direction.

In the present embodiment, the polarization directions of the blue beam LB and the green beams LG1 and LG2 and the polarization direction of the red beam LR both coincide with the axis-Y direction. The blue beam LB, the green beams LG1 and LG2, and the red beam LR thus have the same polarization direction immediately after outputted from the semiconductor lasers 20B, 20G1, 20G2, and 20R. The retardation film 23B, which is provided in the optical path of the blue beam LB and the retardation films 23G, which are provided in the optical paths of the green beams LG1 and LG2, in FIG. 2 in the first embodiment, are therefore not required in the present embodiment.

Along with the change in the orientations of the blue semiconductor laser 20B, the first green semiconductor laser 20G1, and the second green semiconductor laser 20G2 from those in the first embodiment, the orientation of the focusing lenses 24, which the blue beam LB and the green beams LG1 and LG2 enter, is also changed from that in the first embodiment. Out of the four focusing lenses 24, the focusing lenses 24 which the blue beam LB and the green beams LG1 and LG2 enter are so disposed that the lengthwise direction of the focusing lenses 24 is oriented in the axis-X direction and the widthwise direction thereof is oriented in the axis-Y direction.

The other configurations of the light source apparatus 9 are the same as those in the first embodiment.

Effects of Third Embodiment

The light source apparatus 9 according to the present embodiment also provides the same effects as those provided by the first embodiment: The color beams can be efficiently incident on the light modulator 6 having the pixels PX each formed of the four subpixels SX; the size of the light source apparatus 9 can be reduced; and the configuration of the light source apparatus 9 can be simplified.

In the light source apparatus 9 according to the present embodiment, the red semiconductor laser 20R and the blue semiconductor laser 20B, the first green semiconductor laser 20G1, and the second green semiconductor laser 20G2 are disposed in orientations different from each other.

The configuration described above allows the color beams LB, LG1, LG2, and LR to have the same polarization direction without use of retardation films, whereby the light source apparatus 9 can be simplified.

Variations

In each of the embodiments described above, the laser light source sections each include a single semiconductor laser, and the laser light source sections may instead include a plurality of semiconductor lasers.

Figure 9:
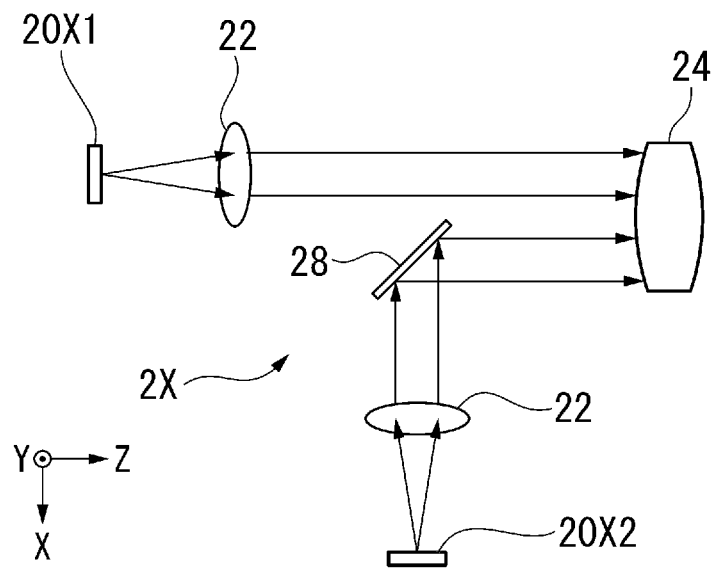
FIG. 9 is a diagrammatic view showing a variation of a light source section.

FIG. 9 shows a laser light source section 2X according to a variation.

The laser light source section 2X according to the variation includes a first semiconductor laser 20X1, a second semiconductor laser 20X2, collimator lenses 22, and a total reflection mirror 28, as shown in FIG. 9. The laser light source section 2X according to the variation thus includes the two semiconductor lasers 20X1 and 20X2.

The first semiconductor laser 20X1 is disposed so as to output a beam in the direction +Z. The second semiconductor laser 20X2 is disposed so as to output a beam in the direction −X. That is, the direction in which the first semiconductor laser 20X1 outputs a beam and the direction in which the second semiconductor laser 20X2 outputs a beam are perpendicular to each other. The collimator lenses 22 are provided on the light exiting side of the semiconductor lasers 20X1 and 20X2. The total reflection mirror 28 is provided in the optical path of the beam outputted from the second semiconductor laser 20X2. The beam outputted from the second semiconductor laser 20X2 is reflected off the total reflection mirror 28 and travels in the direction +Z.

Disposing the first semiconductor laser 20X1 and the second semiconductor laser 20X2 in such a way that the beam exiting directions are perpendicular to each other allows the beam outputted from the first semiconductor laser 20X1 and the light outputted from the second semiconductor laser 20X2 to be arranged with a small gap therebetween without interference between the collimator lenses 22. The configuration described above allows the two beams to smoothly enter a focusing lens 24, which is elongated in one direction.

For example, when a laser light source section including a single semiconductor laser outputs a specific color beam having insufficient power, the power of the specific color beam can be increased by using a laser light source section including a plurality of semiconductor lasers, as in the present variation. The color balance of the beam outputted from the light source apparatus can thus be adjusted.

The technical scope of the present disclosure is not limited to the embodiments described above, and a variety of changes can be made thereto to the extent that the changes do not depart from the substance of the present disclosure.

For example, the aforementioned embodiments have been described with reference to the configuration in which the red beam and the blue beam arranged in a diagonal direction of the four subpixels arranged in two rows and two columns and the two green beams arranged in the other diagonal direction are incident on the four subpixels, what is called a Bayer arrangement. In place of the configuration described above, the red beam, the blue beam, and the two green beams may be arranged vertically or horizontally.

In addition to the above, the specific descriptions of the shape, the number, the arrangement, and other factors of the components of the light source apparatus and the projector are not limited to those in the embodiments described above and can be changed as appropriate. The light source apparatus according to the present disclosure may also be used in a display apparatus including no projection optical apparatus.

A light source apparatus according to an aspect of the present disclosure may have the configuration below.

The light source apparatus according to the aspect of the present disclosure includes a first laser light source section that outputs first light having a first wavelength band, a second laser light source section that outputs second light having a second wavelength band different from the first wavelength band, a third laser light source section that outputs third light having the second wavelength band, and a fourth laser light source section that outputs fourth light having a third wavelength band different from the first and second wavelength bands. The first, second, third, and fourth laser light source sections each includes a semiconductor laser. Any two of the first, second, third, and fourth laser light source sections are disposed in an imaginary plane perpendicular to the center axis of a luminous flux formed of the first light, the second light, the third light, and the fourth light and on a first imaginary line that intersects with the center axis so as to face each other with the center axis sandwiched between the two laser light source sections. The other two of the first, second, third, and fourth laser light source sections are disposed in the imaginary plane and on a second imaginary line perpendicular to the first imaginary line so as to face each other with the center axis sandwiched between the two laser light source sections. The first, second, third, and fourth laser light source sections are disposed in the imaginary plane at the same distance from the center axis. The first light, the second light, the third light, and the fourth light are each linearly polarized light and have the same polarization direction.

In the light source apparatus according to the aspect of the present disclosure, the first light may be blue light, the second light and the third light may each be green light, and the fourth light may be red light.

The light source apparatus according to the aspect of the present disclosure may further include retardation films provided in the optical path of the first light outputted from the first laser light source section, the optical path of the second light outputted from the second laser light source section, and the optical path of the third light outputted from the third laser light source section.

The light source apparatus according to the aspect of the present disclosure may further include a retardation film provided in the optical path of the fourth light outputted from the fourth laser light source section.

The light source apparatus according to the aspect of the present disclosure may further include a diffuser plate that diffuses the first light outputted from the first laser light source section, the second light outputted from the second laser light source section, the third light outputted from the third laser light source section, and the fourth light outputted from the fourth laser light source section, and a driver that rotates the diffuser plate around an axis of rotation parallel to the center axis.

The light source apparatus according to the aspect of the present disclosure may further include focusing lenses provided in the optical path of the first light between the first laser light source section and the diffuser plate, the optical path of the second light between the second laser light source section and the diffuser plate, the optical path of the third light between the third laser light source section and the diffuser plate, and the optical path of the fourth light between the fourth laser light source section and the diffuser plate.

In the light source apparatus according to the aspect of the present disclosure, the driver may be provided on the same side of the diffuser plate as the side where the focusing lenses are provided, and the shape of each of the focusing lenses viewed in the direction of the center axis may have a widthwise direction parallel to the lengthwise direction of the light exiting surface of each of the semiconductor lasers and a lengthwise direction parallel to the widthwise direction of the light exiting surface.

In the light source apparatus according to the aspect of the present disclosure, the axis of rotation may be disposed in a position separate from the center axis, and the diffuser plate may have a first diffusion area where the first light enters, a second diffusion area where the second light and the third light enter, and a third diffusion area where the fourth light enters.

In the light source apparatus according to the aspect of the present disclosure, the first, second, and third diffusion areas may have diffusion characteristics different from one another.

The light source apparatus according to the aspect of the present disclosure may further include pickup lenses provided in the optical path of the first light having exited out of the diffuser plate, the optical path of the second light having exited out of the diffuser plate, the optical path of the third light having exited out of the diffuser plate, and the optical path of the fourth light having exited out of the diffuser plate.

In the light source apparatus according to the aspect of the present disclosure, the distance between the pickup lens provided in the optical path of the first light and the diffuser plate, the distance between the pickup lens provided in the optical path of each of the second light and the third light and the diffuser plate, and the distance between the pickup lens provided in the optical path of the fourth light and the diffuser plate may be different from one another.

A light source apparatus according to another aspect of the present disclosure includes a first semiconductor laser light source section that outputs blue first light, a second semiconductor laser light source section that outputs green second light, a third semiconductor laser light source section that outputs green third light, and a fourth semiconductor laser light source section that outputs red fourth light. Any two of the first, second, third, and fourth semiconductor laser light source sections are disposed in an imaginary plane perpendicular to the center axis of a luminous flux formed of the first light, the second light, the third light, and the fourth light and on a first imaginary line that intersects with the center axis so as to face each other with the center axis sandwiched between the two laser light source sections. The other two of the first, second, third, and fourth semiconductor laser light source sections are disposed in the imaginary plane and on a second imaginary line perpendicular to the first imaginary line so as to face each other with the center axis sandwiched between the two laser light source sections. The first, second, third, and fourth semiconductor laser light source sections are disposed in the imaginary plane at the same distance from the center axis. The widthwise directions of the light exiting surfaces of the first, second, and third semiconductor laser light source sections are oriented in the same direction, and the widthwise direction of the light exiting surface of the fourth semiconductor laser light source section is oriented in a direction different from the widthwise direction of the light exiting surface of the first semiconductor laser light source section.

A projector according to another aspect of the present disclosure may have the configuration below.

The projector according to the other aspect of the present disclosure includes the light source apparatus according to the aspect of the present disclosure, a light modulator that modulates light outputted from the light source apparatus in accordance with image information, and a projection optical apparatus that projects the light modulated by the light modulator.

What is claimed is:

1. A light source apparatus comprising:
    a first laser light source section that outputs first light having a first wavelength band;
    a second laser light source section that outputs second light having a second wavelength band different from the first wavelength band;
    a third laser light source section that outputs third light having the second wavelength band;
    a fourth laser light source section that outputs fourth light having a third wavelength band different from the first and second wavelength bands;
    a diffuser plate that diffuses the first light outputted from the first laser light source section, the second light outputted from the second laser light source section, the third light outputted from the third laser light section, and the fourth light outputted from the fourth laser light source section; and
    a driver that rotates the diffuser plate around an axis of rotation,
    wherein the first, second, third, and fourth laser light source sections each includes a semiconductor laser,
    any two of the first, second, third, and fourth laser light source sections are disposed in an imaginary plane perpendicular to a center axis of a luminous flux formed of the first light, the second light, the third light, and the fourth light and on a first imaginary line that intersects with the center axis so as to face each other with the center axis sandwiched between the two laser light source sections,
    other two of the first, second, third, and fourth laser light source sections are disposed in the imaginary plane and on a second imaginary line perpendicular to the first imaginary line so as to face each other with the center axis sandwiched between the two laser light source sections,
    the axis of rotation is parallel to the center axis,
    the first, second, third, and fourth laser light source sections are disposed in the imaginary plane at the same distance from the center axis, and
    the first light, the second light, the third light, and the fourth light are each linearly polarized light and have the same polarization direction.

2. The light source apparatus according to claim 1, wherein the first light is blue light, the second light and the third light are each green light, and the fourth light is red light.

3. The light source apparatus according to claim 2, further comprising retardation films provided in an optical path of the first light outputted from the first laser light source section, an optical path of the second light outputted from the second laser light source section, and an optical path of the third light outputted from the third laser light source section.

4. The light source apparatus according to claim 2, further comprising a retardation film provided in an optical path of the fourth light outputted from the fourth laser light source section.

5. The light source apparatus according to claim 1, further comprising focusing lenses provided in an optical path of the first light between the first laser light source section and the diffuser plate, an optical path of the second light between the second laser light source section and the diffuser plate, an optical path of the third light between the third laser light source section and the diffuser plate, and an optical path of the fourth light between the fourth laser light source section and the diffuser plate.

6. The light source apparatus according to claim 5,
wherein the driver is provided on the same side of the diffuser plate as the side where the focusing lenses are provided, and
a shape of each of the focusing lenses viewed in a direction of the center axis has a widthwise direction parallel to a lengthwise direction of a light exiting surface of each of the semiconductor lasers and a lengthwise direction parallel to a widthwise direction of the light exiting surface.

7. The light source apparatus according to claim 1,
wherein the axis of rotation is disposed in a position separate from the center axis, and
the diffuser plate has a first diffusion area where the first light enters, a second diffusion area where the second light and the third light enter, and a third diffusion area where the fourth light enters.

8. The light source apparatus according to claim 7, wherein the first, second, and third diffusion areas have diffusion characteristics different from one another.

9. The light source apparatus according to claim 1, further comprising pickup lenses provided in an optical path of the first light that exits out of the diffuser plate, an optical path of the second light that exits out of the diffuser plate, an optical path of the third light that exits out of the diffuser plate, and an optical path of the fourth light that exits out of the diffuser plate.

10. The light source apparatus according to claim 9, wherein a distance between the pickup lens provided in the optical path of the first light and the diffuser plate, a distance between the pickup lens provided in the optical path of each of the second light and the third light and the diffuser plate, and a distance between the pickup lens provided in the optical path of the fourth light and the diffuser plate are different from one another.

11. A projector comprising:
the light source apparatus according to claim 1;
a light modulator that modulates light outputted from the light source apparatus in accordance with image information; and
a projection optical apparatus that projects the light modulated by the light modulator.

12. A light source apparatus comprising:
a first laser light source section that outputs first light having a first wavelength band;
a second laser light source section that outputs second light having a second wavelength band different from the first wavelength band;
a third laser light source section that outputs third light having the second wavelength band;
a fourth laser light source section that outputs fourth light having a third wavelength band different from the first and second wavelength bands; and
retardation films provided in an optical path of the first light outputted from the first laser light source section, an optical path of the second light outputted from the second laser light source section, and an optical path of the third light outputted from the third laser light source section,
wherein the first, second, third, and fourth laser light source sections each includes a semiconductor laser,
any two of the first, second, third, and fourth laser light source sections are disposed in an imaginary plane perpendicular to a center axis of a luminous flux formed of the first light, the second light, the third light, and the fourth light and on a first imaginary line that intersects with the center axis so as to face each other with the center axis sandwiched between the two laser light source sections,
other two of the first, second, third, and fourth laser light source sections are disposed in the imaginary plane and on a second imaginary line perpendicular to the first imaginary line so as to face each other with the center axis sandwiched between the two laser light source sections,
the first, second, third, and fourth laser light source sections are disposed in the imaginary plane at the same distance from the center axis,
the first light, the second light, the third light, and the fourth light are each linearly polarized light and have the same polarization direction, and
the first light is blue light, the second light and the third light are each green light, and the fourth light is red light.

13. A light source apparatus comprising:
a first laser light source section that outputs first light having a first wavelength band;
a second laser light source section that outputs second light having a second wavelength band different from the first wavelength band;
a third laser light source section that outputs third light having the second wavelength band;
a fourth laser light source section that outputs fourth light having a third wavelength band different from the first and second wavelength bands; and
a retardation film provided in an optical path of the fourth light outputted from the fourth laser light source section,
wherein the first, second, third, and fourth laser light source sections each includes a semiconductor laser,
any two of the first, second, third, and fourth laser light source sections are disposed in an imaginary plane perpendicular to a center axis of a luminous flux formed of the first light, the second light, the third light, and the fourth light and on a first imaginary line that intersects with the center axis so as to face each other with the center axis sandwiched between the two laser light source sections,
other two of the first, second, third, and fourth laser light source sections are disposed in the imaginary plane and on a second imaginary line perpendicular to the first imaginary line so as to face each other with the center axis sandwiched between the two laser light source sections,
the first, second, third, and fourth laser light source sections are disposed in the imaginary plane at the same distance from the center axis, and
the first light, the second light, the third light, and the fourth light are each linearly polarized light and have the same polarization direction, and
the first light is blue light, the second light and the third light are each green light, and the fourth light is red light.

* * * * *